United States Patent [19]

Pollington

[11] 4,027,867

[45] June 7, 1977

[54] WORKPIECE HOLDER

[76] Inventor: Bernard M. Pollington, Finkle Road, McBain, Mich. 49657

[22] Filed: Jan. 30, 1976

[21] Appl. No.: 653,733

[52] U.S. Cl. .................................. 269/94; 269/234

[51] Int. Cl.$^2$ .................................. B23Q 3/02

[58] Field of Search .............. 269/91, 94, 229, 234, 269/237, 238, 286, 254 R

[56] References Cited

UNITED STATES PATENTS

| | | | |
|---|---|---|---|
| 162,866 | 5/1875 | Squire | 269/94 |
| 319,816 | 6/1885 | Hoefer | 269/254 R |
| 941,832 | 11/1909 | Widmann | 269/238 |
| 2,850,926 | 9/1958 | Jobe | 269/234 |

*Primary Examiner*—Al Lawrence Smith
*Assistant Examiner*—Robert C. Watson
*Attorney, Agent, or Firm*—Gifford, Chandler, Sheridan & Sprinkle

[57] ABSTRACT

A workpiece holder is provided for selectively clamping a workpiece to a work table. The workpiece holder comprises a base secured to the table, an elongated clamp member positioned above the base and generally parallel thereto, and a bending arm secured at one end to the base and at its other end to the clamp member at a point intermediate the longitudinal ends of the clamp member thus dividing the clamp member into a first and second leg. The bending arm is dimensioned so as to form a slot having a predetermined width between the base and the first leg of the clamp member. A plunger is axially received within the slot and includes an upper inclined surface adapted to abut against the first leg of the clamp member and force the first leg away from the base as the plunger is moved axially into the slot. Simultaneously, the bending arm bends so that the second leg of the clamp member moves toward the work table for clampingly engaging the workpiece.

15 Claims, 2 Drawing Figures

WORKPIECE HOLDER

BACKGROUND OF THE INVENTION

I. Field of the Invention

The present invention relates generally to workpiece holders, and more particularly, to a workpiece holder for selectively clamping the workpiece to a work table.

II. Description of the Prior Art

For many types of manufacturing operations, such as a drilling operation, a workpiece must be secured against movement to a work table. There have been many previously known devices, such as C-clamps and vises for securing the workpiece to the work table. These previously known devices are typically manually operated and are consequently time consuming to operate. The previously known manually operated workpiece holders thus unnecessarily increase the labor costs of the manufacturing operation.

Other previously known workpiece holders have been devised in which the workpiece holder is machine, rather than manually, powered. While machine powered workpiece holders are adequate in operation and generally accepted in the trade, such workpiece holders are very expensive not only to purchase but also to install and maintain. Moreover such workpiece holders typically must be specially designed and manufactured for a particular manufacturing operation so that the workpiece holder is not readily adaptable to other types of manufacturing operations.

SUMMARY OF THE PRESENT INVENTION

The present invention solves the abovementioned disadvantages of the previously known workpiece holders by providing a machine powered workpiece holder which is not only inexpensive in construction, installation and maintenance, but also is readily adaptable to a wide variety of manufacturing operations.

In brief, the workpiece holder of the present invention comprises a base secured to a work table and an elongated clamp member disposed above the base and generally parallel thereto. A generally vertical bending arm is secured at its lower end to the base and at its upper end to the clamp member at a point intermediate the longitudinal ends of the clamp member thus dividing the clamp member into a first and second transverse leg. The bending arm is dimensioned so as to maintain a slot of predetermined width between the base and the first link of the clamp member.

A plunger having an upper inclined surface is positioned to be received within the slot so that the inclined surface abuts against the first leg of the clamp member. As the plunger is moved axially in the slot, the inclined surface of the plunger forces the first leg of the clamp member to move away from the base thus widening the slot. Simultaneously, the bending arm bends so that the second leg of the clamp member moves in a direction opposite from the first leg; i.e. the second leg moves toward the worktable. In this manner with a workpiece between the clamp member second leg and the table, the second leg moves toward a clamping engagement of the workpiece as the plunger moves into the slot. The subsequent retraction of the plunger permits the clamp member to return to its original position thus releasing the workpiece.

An actuator functions to axially position the plunger in the slot. In the preferred form of the invention the actuator is a hydraulic actuator.

BRIEF DESCRIPTION OF THE DRAWINGS

The workpiece holder of the present invention will be more clearly understood by reference to the following detailed description when read in conjunction with the accompanying drawings wherein like reference characters refer to like parts throughout the several views and in which.

DETAILED DESCRIPTION

Figure 1:
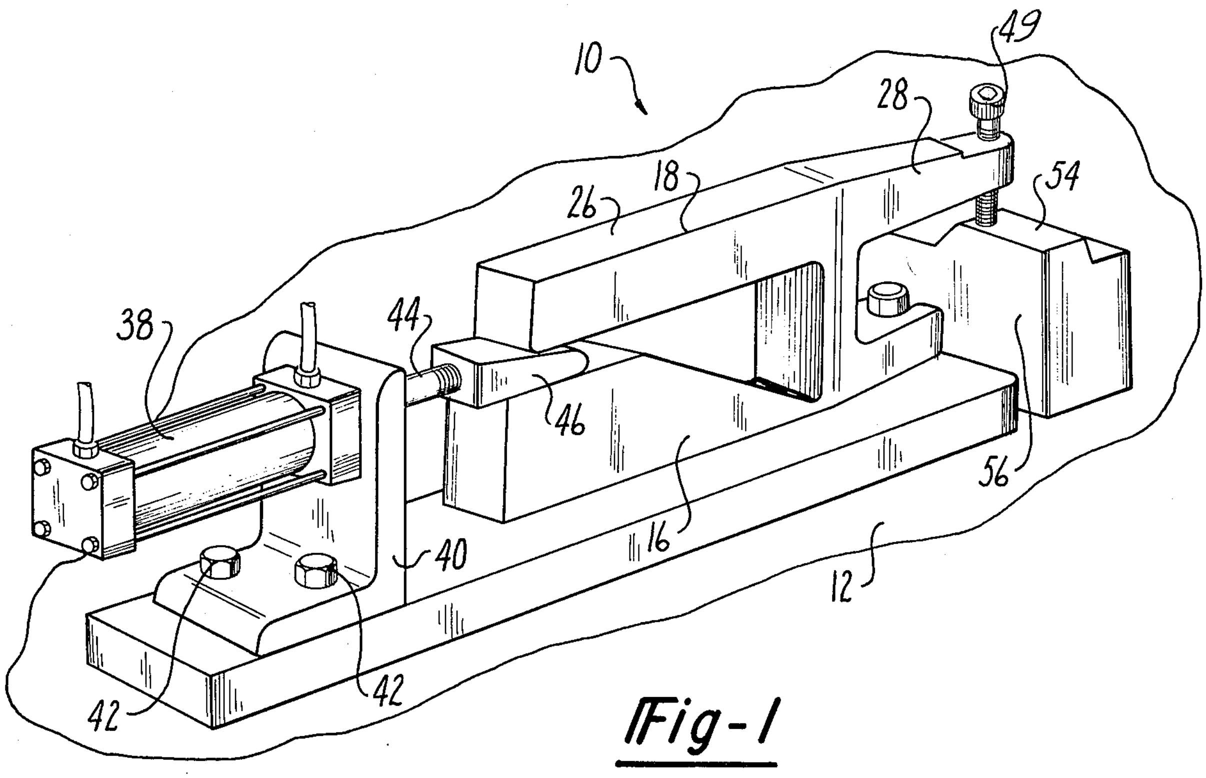
FIG. 1 is a perspective view showing the workpiece holder of the present invention.

The workpiece holder 10 of the present invention generally comprises a base portion 16 secured to a work table 12 by bolts 14 and an elongated clamp member 18 disposed above the base portion 16 and generally parallel thereto. A generally vertical bending arm 20 is secured at one end to the base portion 16 and at its upper end to the clamp member 18 at a position between the longitudinal ends 22 and 24 of the clamp member 18 thus defining a first leg 26 and a second leg 28 of the clamp member 18. The bending arm 20 is axially dimensioned so as to maintain a slot 30 having a predetermined width between the first leg 26 of the clamp member 18 and a raised portion 32 of the base 16. The base portion 16, the bending arm 20, and the clamp member 18 are preferably integral with each other and additionally the width 34 of the clamp member 18 is substantially larger than the width 36 of the bending arm 20 for a purpose to be hereinafter described in detail.

A conventional hydraulic actuator 38 having an actuator rod 44 is secured to an actuator support 40 which in turn is secured to the worktable 12 by bolts 42. A plunger 46 is threadably secured to the outwardly extending end of the rod 44 and the actuator 38 and plunger 46 are positioned so that the plunger 46 is adapted to be received axially within the slot 30. The plunger 46 includes an upper inclined surface 48 which abuts against the first leg 26 of the clamp member 18 and is adapted to force the first leg 26 away from the base portion 16 as will be shortly described.

At the other end of the clamp member 18, a bolt member 49 is threadably engaged in a vertical bore 50 formed through the clamp member second leg 28. The bolt member 49 includes a downwardly facing abutment surface 52 adapted to abut against the top surface 54 of a workpiece 56 in a manner to be shortly described. It should be apparent that rotation of the bolt member 49 varies the vertical distance between the abutment surface 52 and the top surface of the work table 12.

The operation of the workpiece holder 10 is as follows: with the plunger 46 in a retracted position, shown in solid lines in FIG. 2, and with the workpiece 56 positioned between the bolt member 49 and the work table 12, a small gap 60 exists between the bolt member abutment surface 52 and the workpiece upper surface 54. Thus, in this position, the workpiece 56 can be easily moved on the table 12 to any desired position.

Figure 2:
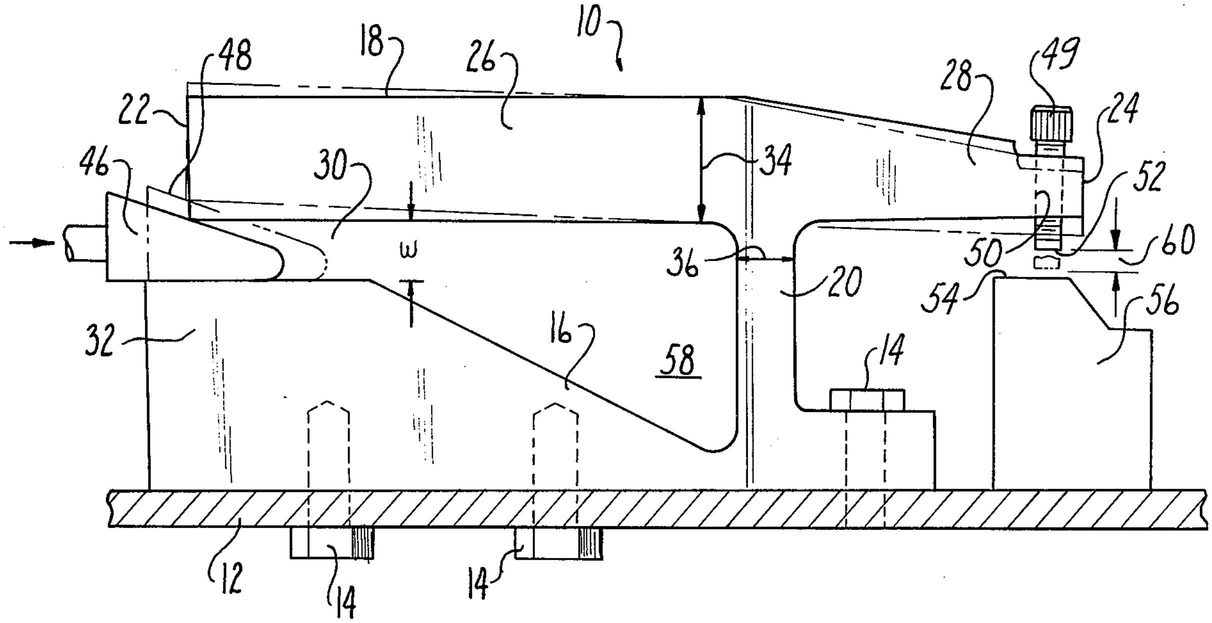
FIG. 2 is a side plan view showing the workpiece holder of the present invention with parts eliminated and enlarged for clarity.

With the workpiece 56 properly positioned, the actuator 38 is activated thus forcing the plunger 46 axially into the slot 30 or rightward as viewed in FIG. 2. Simultaneously the inclined surface 48 of the plunger 46 abuts against the clamp member first leg 18 and forces the first leg 18 to move away from the base portion 16, as shown in phantom line in FIG. 2. Since the width 34 of the clamp member 18 is substantially greater than the width 36 of the bending arm 20, the above described movement of the first leg 18 causes the bending arm 20 to bend in a clockwise direction as viewed in FIG. 2. In addition, it has been found that the provision of an enlarged cavity 58 between the arm 20 and the base portion 16 enhances the bending action of the arm 20.

As the first leg 18 moves away from the base portion 16, simultaneously the clamp member second leg 28 moves toward the work table 12 in the obvious fashion. Movement of the second leg 28 causes the bolt member abutment surface 52 to abut against the workpiece top surface 54 thereby clamping the workpiece 56 against movement relative to the work table 12, as shown in phantom lines. With the bolt member 49 clampingly engaging the workpiece 56, a machine operation may be performed on the workpiece 56. When desired, deactivation of the actuator 38 causes the plunger 46 to retract from the slot 30 and permits the clamp member second leg 28 to return to its original position, shown in solid line, thereby releasing the workpiece 56.

Rotation of the bolt member 49 permits adjustment of the workpiece holder 10 for workpieces having a different vertical height. Likewise spacers may be positioned between the worktable 12 and the base portion 16 in order to accommodate workpieces having a relatively large vertical dimension.

It is thus apparent that the workpiece holder of the present invention provides a holder which is simple and inexpensive in construction. Furthermore, the holder of the present invention is readily adaptable to different types of workpieces by a simple adjustment of the bolt member 49. Moreover the holder of the present invention requires virtually no maintenance and is also easily and inexpensively installed upon a worktable.

Having described my invention many modifications thereto will become apparent to those skilled in the art to which it pertains without deviating from the spirit of the invention as defined by the scope of the appended claims.

What is claimed is:

1. A workpiece holder for clamping a workpiece to a work table comprising:

a base secured to said work table, an elongated clamp member positioned above said base and generally parallel thereto, a bending arm secured at one end to said base and at its other end to said clamp member at a position intermediate the longitudinal ends of said clamp member thereby dividing the clamp member into a first and second leg, said bending arm being dimensioned so as to form a slot of predetermined width between said base and said first leg of the clamp member, a plunger adapted to be axially received in said slot and having means to vary the width of said slot in dependence on the axial position of said plunger so that said second leg of said clamp member moves in a direction for engaging said workpiece, and means for varying the axial position of said plunger, wherein said base, said clamp member, and said bending arm are integral with each other.

2. The workpiece holder as defined in claim 1 wherein said plunger includes an upper inclined surface adapted to abut against said clamp member and widen said slot as said plunger is moved axially into said slot.

3. The workpiece holder as defined in claim 1 wherein said means for varying the axial position of the plunger comprises an actuator.

4. The workpiece holder as defined in claim 3 wherein said actuator is a hydraulic actuator.

5. The workpiece holder as defined in claim 1 and including means secured to said second leg of said clamp member and having an abutment surface for engaging said workpiece wherein the distance between said last abutment surface and said work table is adjustable.

6. The workpiece holder as defined in claim 5 wherein said last mentioned means comprises a screw member engaged in a threaded bore in the second leg of said clamp member.

7. The workpiece holder as defined in claim 1 wherein said base, said clamp member, and said bending arm are integral with each other.

8. The workpiece holder as defined in claim 1 wherein the width of said clamp member is substantially greater than the width of said bending arm.

9. A workpiece holder for clamping a workpiece to a work table comprising:

a base secured to said work table, an elongated clamp member positioned above said base and generally parallel thereto, a bending arm constructed of a resilient material, said bending arm rigidly secured at one end to said base and rigidly secured at its other end to said clamp member at a position intermediate the longitudinal ends of said clamp member thereby dividing the clamp member into a first and second leg, said bending arm being dimensioned so as to form a slot of predetermined width between said base and said first leg of the clamp member, a plunger adapted to be axially received in said slot and having means to vary the width of said slot as said plunger is moved in a first axial direction so that said second leg of said clamp member moves in a direction for engaging said workpiece, and means for varying the axial position of said plunger, wherein as said plunger is moved in a direction opposite from the first axial direction, the resilient bending arm returns the slot to said predetermined width and thereby moves said second leg in a direction opposite from the workpiece engaging direction.

10. The workpiece holder as defined in claim 9 wherein said plunger includes an upper inclined surface adapted to abut against said clamp member and widen said slot as said plunger is moved axially into said slot.

11. The workpiece holder as defined in claim 9 wherein said means for varying the axial position of the plunger comprises an actuator.

12. The workpiece holder as defined in claim 11 wherein said actuator is a hydraulic actuator.

13. The workpiece holder as defined in claim 9 and including means secured to said second leg of said clamp member and having an abutment surface for engaging said workpiece wherein the distance between said last abutment surface and said work table is adjustable.

14. The workpiece holder as defined in claim 13 wherein said last mentioned means comprises a screw member engaged in a threaded bore in the second leg of said clamp member.

15. The workpiece holder as defined in claim 9 wherein the width of said clamp member is substantially greater than the width of said bending arm.

* * * * *

UNITED STATES PATENT AND TRADEMARK OFFICE

CERTIFICATE OF CORRECTION

PATENT NO. : 4,027,867
DATED : June 7, 1977
INVENTOR(S) : Bernard M. Pollington

It is certified that error appears in the above-identified patent and that said Letters Patent are hereby corrected as shown below:

Claim 7, line 1, after "claim" delete "1" and insert thereinstead --9--.

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*